July 1, 1930.                A. MOORE                1,768,854
PRESSURE CONTROLLED CHARGE MODIFYING APPARATUS
FOR INTERNAL COMBUSTION ENGINES
Filed July 26, 1926          4 Sheets-Sheet 1
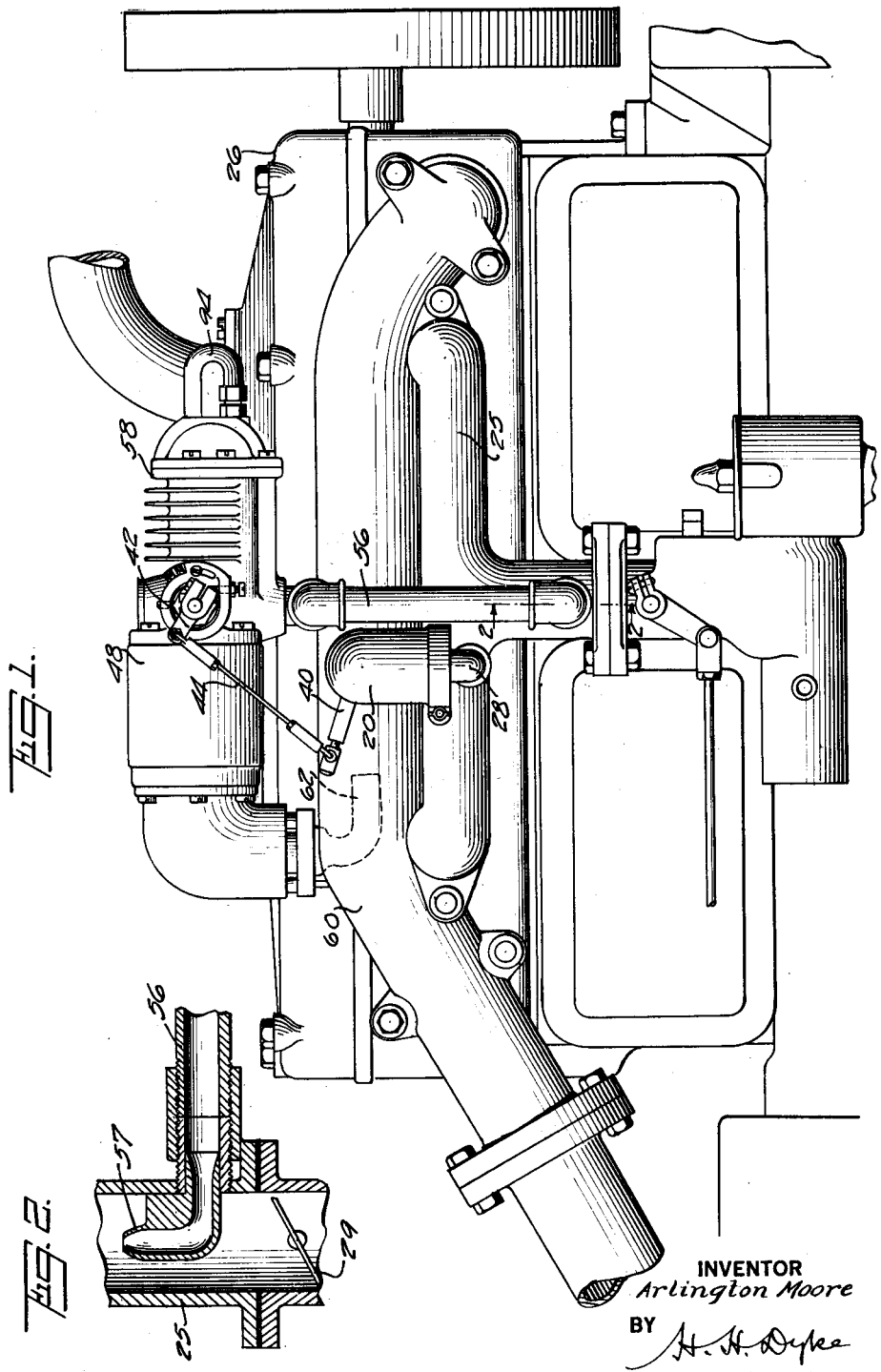
INVENTOR
Arlington Moore
BY
ATTORNEY

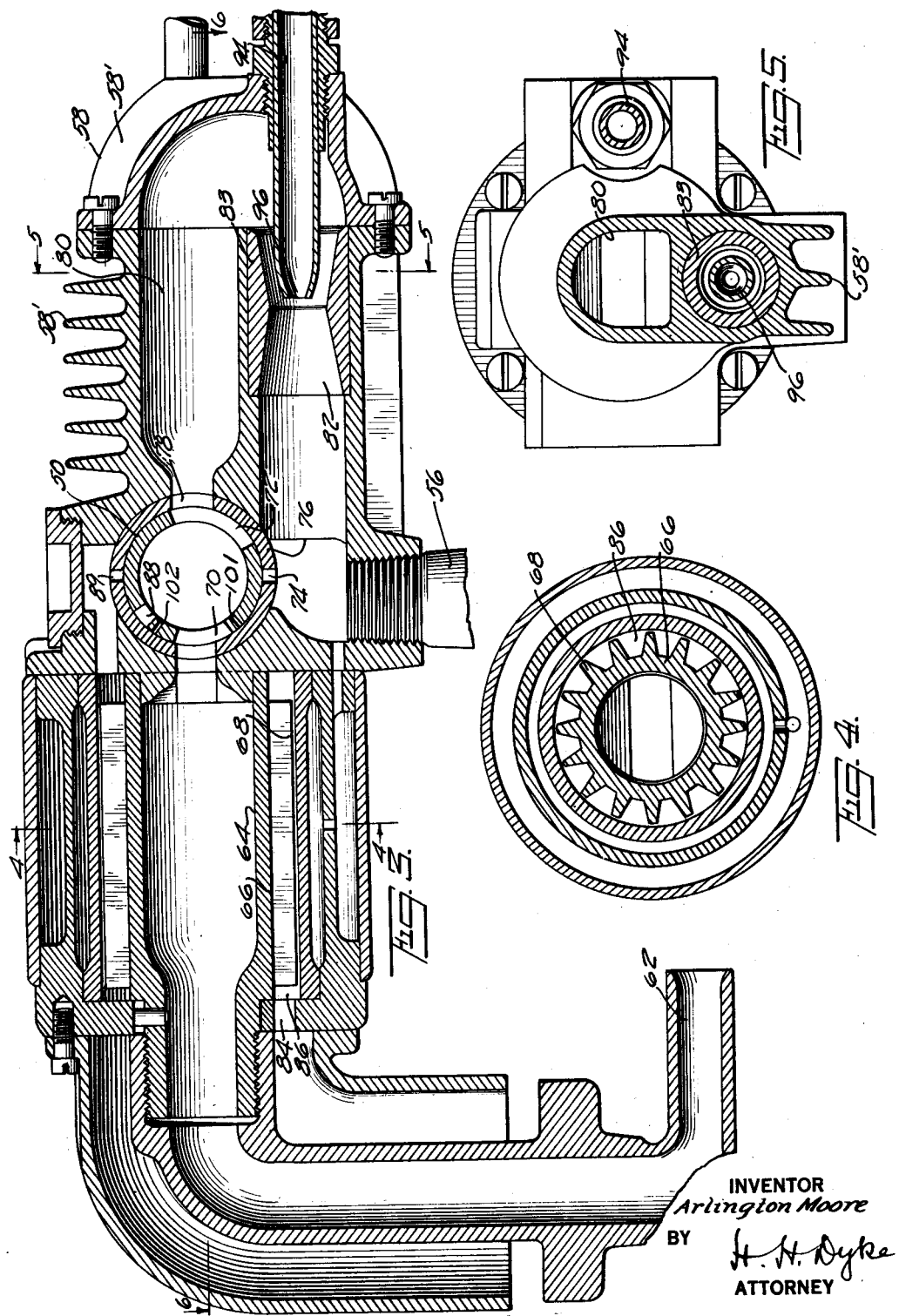

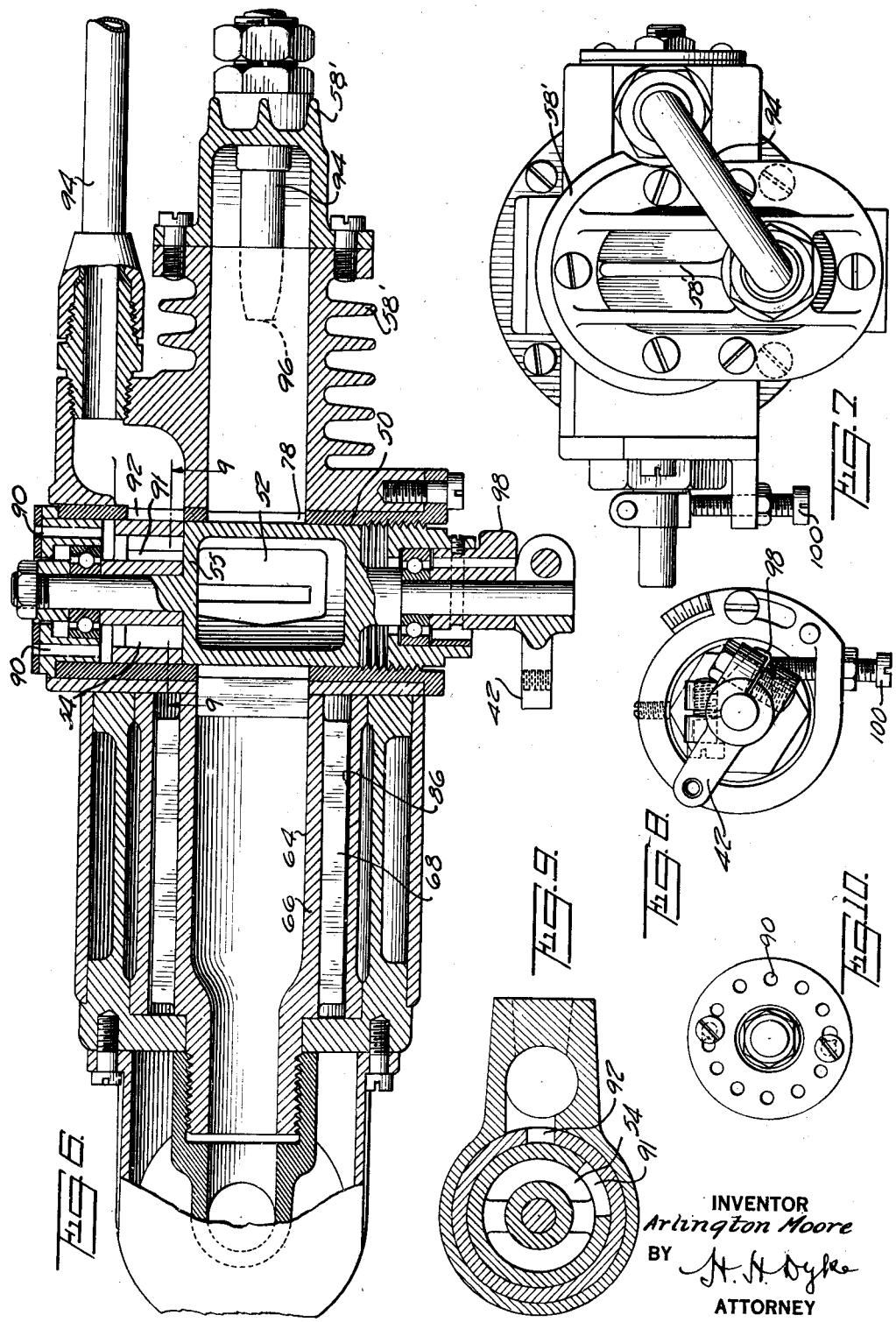

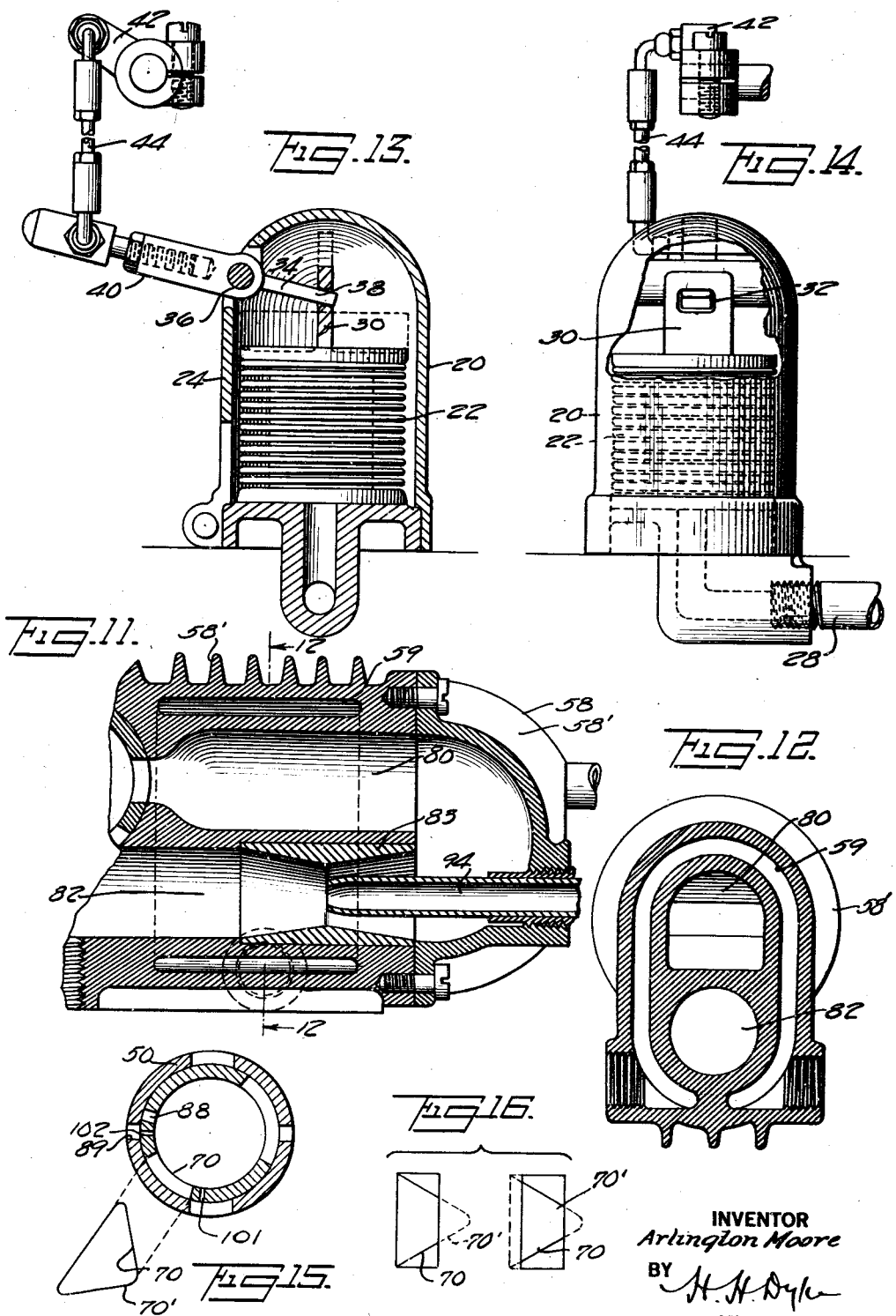

Patented July 1, 1930

1,768,854

UNITED STATES PATENT OFFICE

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE

PRESSURE-CONTROLLED CHARGE-MODIFYING APPARATUS FOR INTERNAL-COMBUSTION ENGINES

Application filed July 26, 1926. Serial No. 124,923.

My invention relates to apparatus for supplying exhaust gas and air to the intake conduit of an internal combustion engine above the throttle for beneficially modifying the composition, temperature and state of the fuel and air mixture delivered by the carburetor of the engine; and has for its principal object the provision of means for utilizing pressure changes in the intake conduit to regulate the supply of charge modifying gases. In this way the introduction of charge modifying gases to the engine intake is automatically controlled so as to be subject to the various factors which affect the intake pressure, including not only the extent of throttle opening, which, of course, has the greatest effect in determining the intake pressure, but also engine speed, etc.

The introduction of modifying gases to the intake above the throttle serves in itself to increase the intake pressure and to thereby reduce the difference between intake pressure and the pressure of the surrounding atmosphere, but by means of an efficient apparatus, such as a pressure responsive device, the changes in such pressure difference, notwithstanding their reduction due to admission of charge modifying gases above the throttle, can be used effectively for the control of the supply of the modifying gases, and in the preferred embodiment of my invention a bellows is made use of for this purpose having its interior in communication with the engine intake and its exterior exposed to the atmosphere.

The invention will be best understood from a description of the apparatus shown in the accompanying drawings for illustrating applications of the principle of the invention, which, however, may be made use of with apparatus of various forms. In these drawings Fig. 1 is a side view of an internal combustion engine equipped with apparatus embodying my invention. Fig. 2 is a section on line 2—2, Fig. 1. Fig. 3 is a longitudinal section of the apparatus for supplying charge modifying gases. Fig. 4 is a transverse section on line 4—4, Fig. 3. Fig. 5 is a transverse section on line 5—5, Fig. 3. Fig. 6 is a longitudinal section on line 6—6, Fig. 3. Fig. 7 is a plan or top view of the apparatus shown in longitudinal section in Figs. 3 and 6. Fig. 8 is an end view of the metering rotor. Fig. 9 is a section on line 9—9, Fig. 6. Fig. 10 is an elevation of the end of the metering rotor opposite that shown in Fig. 8. Fig. 11 is a view similar to a portion of Fig. 3, but showing a modification in which the cooler for charge modifying gases is water jacketed. Fig. 12 is a section on line 12—12, Fig. 11. Fig. 13 is a sectional view of the bellows of Fig. 1, and Fig. 14 is a side view thereof. Fig. 15 is a transverse section of the metering rotor with the exhaust gas port shown in elevation, and Fig. 16 is a diagrammatical view illustrating two positions of the exhaust gas port of the metering rotor.

Reference character 20 indicates an expansible-contractible device comprising a bellows 22 in an open casing 24, the hollow interior of bellows 22 being in communication with the intake conduit 25 of an internal combustion engine 26, through the pipe 28 screwed into the intake conduit 25 above the engine throttle 29. Bellows 22, which is of spring material adapted to return to its normally expanded state when the interior pressure is the same as the exterior pressure, carries a block 30, having a hole 32 with rounded edges, and a lever 34 pivoted in casing 24 at 36 and having an arm 38 extending through the hole 32 in block 30 by which it is actuated, serves by movement of projecting arm 40, which is preferably made adjustable as to length, to actuate the crank 42 of the metering mechanism of the charge modifying apparatus, being connected to crank 42 of such metering mechanism by link 44, which is also preferably made adjustable as to length.

The charge modifying apparatus 48, shown herein, is in general about as shown in my application Serial No. 85,450, filed Feb. 2, 1926, with the principal exception that the metering mechanism, which in my said application is linked to move with the throttle, is, according to the present invention, actuated from bellows 22 as described above.

The metering mechanism for admission of charge modifying gases above the throttle comprises a rotor 50 to which the crank 42 is attached. Said rotor 50 has provision for inlet of exhaust gas and hot air to its hollow interior part 52 and of cold air to the hollow interior part 54, separated from part 52 by the partition 55, and has provision for supplying gaseous materials and mixtures from the chambers 52 and 54 either direct to the engine intake conduit 25 through pipe 56 or first through the cooler 58 and thence to the intake by pipe 56. Pipe 56 preferably terminates in the nozzle 57 directed with the fuel and air stream in the intake 25.

Exhaust gas from exhaust conduit 60 enters the impact tube 62, directed upstream of the path of gas flow in the exhaust gas conduit, so as to utilize the full kinetic energy of the gases for promoting their passage to the engine intake, and passes through the chamber 64 in the heater 66 having extensive heat radiating outer surfaces, such as fins 68, and into chamber 52 of rotor 50 by the valve port 70. These and other gases leave chamber 52 in rotor 50 by the valve port 72 which communicates either direct with the pipe 56 through port 74 in the rotatably adjustable sleeve 76 encircling rotor 50, or else, upon appropriate rotation of rotor 50, communicates through port 78 in said sleeve 76 with the passage 80 and return passage 82 in cooler 58 provided with cooling means, such as the heat radiating fins 58' and/or the water jacket 59 (Figs. 11 and 12) connected with the water circulating cooling system of the engine. The return passage 82 contains the Venturi tube 83 for aspiration of cold air and from said return passage 82 the gases pass to the engine intake through pipe 56.

Air from off the exhaust conduit 60 enters the casing of apparatus 48 at 84, and after traversing passage 86 containing the hot fins 68 of stove 66, and being heated thereby, enters chamber 52 in rotor 50 by the valve port 88 in the rotor wall registering with port 89 in sleeve 76.

Cold air enters at 90 and after passing through chamber 54 passes through valve port 91 of rotor 50 and port 92 of sleeve 76, and traverses pipe 94 terminating at 96 in the Venturi tube 83, this arrangement being adapted to cause the aspiration or injection of cold air by the exhaust gas passing to the engine intake through passages 80, 82 and pipe 56.

The quantity and composition of the gases admitted and the course traveled to the engine intake are controlled by the position of rotor 50 under the action of bellows 22. The rotary movement of valve rotor 50 for closing is limited by the shoulder 98 striking against an adjustable stop, such as screw 100, and the bellows is so constructed, calibrated and connected to crank 42 as to cause the rotor 50 to be turned to this position by the compression of the bellows produced by the pressure difference (depression of intake pressure below atmospheric pressure) at engine idling. The metering rotor 50 is shown in idling position in Fig. 15. In the position of the rotor 50 for idling, stop screw 100 is so adjusted that only the bleed holes 101 for exhaust gas and 102 for hot air are open.

As the pressure difference decreases, the bellows expands and rotor 50 turns, causing the port openings 70 and 88 to open. The hot air port 88 closes upon further turning of rotor 50, and as port 88 closes the cold air inlet 91 is gradually opened into pipe 94 upon continued turning of rotor 50, and as cold air is admitted the exhaust gas is sent through the cooler, instead of direct to the intake, and in its path through the cooler serves to aspirate cold air at 96 to be admixed therewith and supplied to the engine intake. When this pressure difference falls to the minimum, that is, when the intake pressure rises to substantially equal the atmospheric pressure, and the bellows is correspondingly expanded, the rotor 50 has been turned as far as it will go in the counter-clockwise direction in the showing of Fig. 3. Fig. 3 shows the rotor 50 turned to such extreme position. With the construction shown the rotor can be turned through about 60° of arc.

The adaptation of the bellows for automatically controlling the metering means and the modifying gases metered thereby to suit the varying engine conditions will be understood from a comparison of the two cases illustrated in Fig. 16, for each of which the throttle is wide open, but the adjustment of the metering means is different.

The port 70 for admission of exhaust gas is narrowed or reduced at its leading end 70' (Fig. 16) so that the opened port area for admission of exhaust gas is increased to a maximum when the rotor is turned to its fullest extent by the bellows 22 being fully expanded. Bellows 22 is so expanded only when the intake pressure is approximately the same as the pressure of the surrounding atmosphere, that is to say, when the throttle opening is substantially the maximum and the engine is under heavy load so that its speed is relatively low. Under such conditions the introduction of exhaust gas is dependent almost entirely on the kinetic energy with which it is delivered from the engine exhaust conduit, and a wide opening and free passage is required to secure delivery of the exhaust gas to the intake. The left hand part of Fig. 16 shows how such wide open, free passage of exhaust gas can take place at such times, the rotor 50 being turned to its maximum extent to automatically provide for free passage of exhaust gas through the wide open port 70, the kinetic energy of the exhaust gas serving to aspirate cold air at 96, and the mixed gases being delivered at 57 in the direction of the fuel and air stream from the carburetor.

When, however, the throttle is wide open, as before, but the engine is under reduced load, with a consequent increase in engine speed and in intake suction, the exhaust gas is drawn in also by increased intake suction, and reliance for delivery of exhaust gas to the intake need not be had as before substantially solely upon the kinetic energy of the moving exhaust gases. Under such circumstances a reduced port opening 70 for exhaust gas will suffice for passage of the exhaust gas required and such reduced opening is automatically obtained by the bellows contracting somewhat, due to the lowered pressure in the intake and in the bellows, thus turning rotor 50 backward to a corresponding extent and exposing the narrowed portion 70' of the exhaust gas port 70 for passage of exhaust gas, as diagrammatically indicated in the right hand part of Fig. 16. The same general relation holds throughout the range of operation of the metering mechanism, same being controlled by the difference between intake pressure and atmospheric pressure, and direct linkage of the metering mechanism to the throttle being dispensed with.

I claim:

1. Means for supplying engine exhaust gas and air to the intake of an internal combustion engine above the throttle, and means responsive to pressure of the engine intake above the throttle for controlling the first named means.

2. Means for supplying exhaust gas to the intake of an internal combustion engine above the throttle, aspirating means for supplying air with the exhaust gas, and means responsive to the differential between intake pressure and atmospheric pressure for controlling the means for supplying exhaust gas and air.

3. In an internal combustion engine, means for supplying exhaust gas from exhaust conduit to the intake conduit above the throttle, a cooler for the exhaust gas, and means responsive to pressure differential between intake pressure and atmospheric pressure for passing the exhaust gas to the intake either direct or through the cooler.

4. In an internal combustion engine, means for supplying exhaust gas from the exhaust conduit to the intake conduit above the throttle, aspirating means for supplying air therewith, a cooler, and means responsive to differential between intake pressure and atmospheric pressure for passing the gases to the intake either direct or through the cooler.

5. In an internal combustion engine, a by-pass conduit for exhaust gas from exhaust to intake over the throttle, means operable by differential between intake pressure and atmospheric pressure for controlling passage of exhaust gas through said conduit, and air aspirating means in said bypass conduit between the control means and the intake conduit.

6. In an internal combustion engine, a conduit for exhaust gases having an inlet directed upstream in the exhaust gas manifold and leading into the intake manifold, means for aspirating air into said conduit, and means for controlling the passage of exhaust gas in the conduit operated by difference in pressure between the engine intake and the atmosphere.

7. In an internal combustion engine, a by-pass for exhaust gas having its inlet directed upstream in the exhaust conduit and its discharge end directed with the stream in the intake above the throttle, air aspirating means in said bypass conduit, and means for controlling the passage of exhaust gas operated by depression of intake pressure below atmospheric pressure.

8. In an internal combustion engine, an expansible-contractible, pressure responsive device having its interior connected to the intake over the throttle for controlling the supply of charge modifying gases including exhaust gas to the intake above the throttle for modifying the charge supplied by the carburetor.

9. In an internal combustion engine, a rotary metering device having an exhaust gas passage of gradually increasing area, means for supplying exhaust gas to said meter, a conduit from the meter to the engine intake over the throttle, and a bellows having the interior thereof connected to the engine intake over the throttle, and actuating means for said metering device operated by contraction and expansion of said bellows.

10. The combination in an internal combustion engine of an expansible-contractible, pressure responsive device comprising a normally spring extended air tight bellows, means of connection from the interior of the bellows to the engine intake over the throttle, a perforated member on the bellows, a pivoted lever having an arm extending through the opening in said member and having a second arm with a link connected thereto, a metering device for gases to be supplied to the engine intake over the throttle, and a crank for said metering device, said link being connected to said crank.

11. In an internal combustion engine, means for supplying modifying gases including exhaust gases to the engine intake above the throttle, a water jacketed cooler for said gases, and means operated by differential between intake pressure and atmospheric pressure for delivering said gases to the intake either direct or through the cooler.

12. In an internal combustion engine, an intake conduit, a throttle therein, means for supplying a component of the charge mixture and a gas under a pressure increasing with the engine load to said intake conduit above the throttle; the delivery of said component being dependent upon the reduction of pressure within said intake conduit and the inductive action of said gas under pressure supplementing each other throughout the operating range of the engine, means for controlling said supplying means, and a device in communication with said intake conduit above the throttle and responding to the variations in pressure therein for operating said controlling means in accordance with said variations.

13. In an internal combustion engine, means for supplying a charge modifying gas to the intake of an internal combustion engine, means for controlling the passage of said gas, and means in communication with said intake above the throttle and responsive to the variations in pressure therein substantially throughout the range of operation of the engine; said last named means being connected to said controlling means to vary the same in accordance therewith, whereby to increase the quantity of said gas delivered as the engine varies in operation from idling to full load.

14. In an internal combustion engine, means for supplying a charge modifying gas to the intake in a heated condition, means for supplying said gas in a cooled condition, and means responsive to variations in pressure within the intake conduit above the throttle for controlling said several means, whereby to cause said gas to be supplied in a heated condition when the intake depression is high and in a cooler condition when the intake depression is relatively lower.

15. In an internal combustion engine, means for supplying exhaust gas to the intake, means for cooling said gas, means for controlling the quantity of said exhaust gas supplied and the thermal condition thereof, and means responsive to variation in pressure in the intake above the throttle for actuating said controlling means in accordance with said variations.

16. In an internal combustion engine, means for supplying exhaust gas to the intake, means for mixing heated air therewith, means for mixing cool air therewith, means for controlling said several means to varying the relative quantities of exhaust gas and air supplied and the thermal condition of the mixture, and means responsive to variations in pressure within the intake above the throttle for correspondingly actuating said controlling means, whereby to automatically increase the exhaust gas content and decrease the temperature thereof as the intake depression lowers.

17. In an internal combustion engine, means for supplying exhaust gas to the intake, means for supplying heated air into admixture with said exhaust gas, aspirating means for supplying cool air into admixture with said exhaust gas, means for controlling the quantity of exhaust gas supplied and rendering said heated air supplying means and said aspirating means successively operative, and means responsive to variations in pressure in the intake above the throttle for actuating said controlling means.

18. In an internal combustion engine, an intake conduit, a throttle therein, means for supplying exhaust gas to the intake above the throttle, and means responsive to variations in pressure within the intake above the throttle for correspondingly varying the extent of opening of the exhaust gas supplying means substantially throughout the load range of the engine; said last named means responding to variations in speed at full load to correspondingly control the extent of opening of said exhaust gas supplying means.

In testimony whereof, I have signed my name hereto.

ARLINGTON MOORE.